United States Patent
Karpf et al.

(10) Patent No.: US 11,403,967 B2
(45) Date of Patent: Aug. 2, 2022

(54) APPARATUS, SYSTEMS, AND METHODS FOR SIMULATING THORACIC PROCEDURE(S)

(71) Applicant: GAUMARD SCIENTIFIC COMPANY, INC., Miami, FL (US)

(72) Inventors: Jeffrey Karpf, Miami, FL (US); Ha Nguyen, Miami, FL (US); Miguel Carvajal, Miami Springs, FL (US)

(73) Assignee: GAUMARD SCIENTIFIC COMPANY, INC., Miami, FL (US)

( * ) Notice: Subject to any disclaimer, the term of this patent is extended or adjusted under 35 U.S.C. 154(b) by 513 days.

(21) Appl. No.: 16/242,700

(22) Filed: Jan. 8, 2019

(65) Prior Publication Data
US 2019/0221137 A1    Jul. 18, 2019

Related U.S. Application Data

(60) Provisional application No. 62/617,020, filed on Jan. 12, 2018.

(51) Int. Cl.
G09B 23/32    (2006.01)
G09B 23/30    (2006.01)
G09B 23/28    (2006.01)

(52) U.S. Cl.
CPC ......... *G09B 23/303* (2013.01); *G09B 23/285* (2013.01); *G09B 23/32* (2013.01)

(58) Field of Classification Search
CPC .... G09B 23/288; G09B 23/303; G09B 23/30; G09B 23/285
USPC ...................................................... 434/268
See application file for complete search history.

(56) References Cited

U.S. PATENT DOCUMENTS

| | | | |
|---|---|---|---|
| 2008/0227073 A1* | 9/2008 | Bardsley ................ | G09B 23/34 434/267 |
| 2012/0034587 A1* | 2/2012 | Toly ..................... | G09B 23/285 434/267 |
| 2016/0217709 A1* | 7/2016 | Minskoff ............... | G09B 23/30 |
| 2017/0011655 A1* | 1/2017 | Sakezles ................ | G09B 23/30 |
| 2017/0372639 A1* | 12/2017 | Cowperthwait ....... | G16H 20/40 |
| 2018/0374390 A1* | 12/2018 | Lindkvist ............. | G09B 23/285 |
| 2019/0057625 A1* | 2/2019 | Quah ..................... | G09B 23/28 |
| 2020/0043371 A1* | 2/2020 | Mele ..................... | G09B 23/30 |

* cited by examiner

*Primary Examiner* — Thomas J Hong
(74) *Attorney, Agent, or Firm* — Haynes and Boone, LLP

(57) ABSTRACT

Apparatus, systems, and methods according to which simulated thoracic, urinary, pulmonary, and/or capillary procedures may be performed.

14 Claims, 9 Drawing Sheets

APPARATUS, SYSTEMS, AND METHODS FOR SIMULATING THORACIC PROCEDURE(S)

CROSS-REFERENCE TO RELATED APPLICATION

This application claims the benefit of the filing date of, and priority to, U.S. Application No. 62/617,020, filed Jan. 12, 2018, the entire disclosure of which is hereby incorporated herein by reference.

TECHNICAL FIELD

This disclosure is related in general to interactive education systems for teaching patient care, and, more particularly, to an interactive patient for simulating thoracic, urinary, pulmonary, and capillary procedures.

BACKGROUND

As medical science has progressed, it has become increasingly important to provide non-human interactive formats for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Non-human interactive devices and systems can be used to teach the skills needed to successfully identify and treat various patient conditions without putting actual patients at risk.

For example, patient care education has often been taught using medical instruments to perform patient care activity on a physical simulator, such as a manikin—a manikin may be a life-sized anatomical human model used for educational and instructional purposes. Such training devices and systems can be used by medical personnel and medical students to teach and assess competencies such as patient care, medical knowledge, practice based learning and improvement, systems based practice, professionalism, and communication. The training devices and systems can also be used by patients to learn the proper way to perform self-examinations. However, existing simulators fail to exhibit accurate symptoms and to respond appropriately to student stimuli, thereby failing to provide realistic medical training to the students. Existing simulators also fail to look and feel lifelike, which fails to improve the training process. Thus, while existing physical simulators have been adequate in many respects, they have not been adequate in all respects. As such, there is a need to provide a simulator for use in conducting patient care training sessions that overcomes the above deficiencies of existing stimulators by, for example, being even more realistic and/or including additional simulated features.

DETAILED DESCRIPTION

Figure 1:
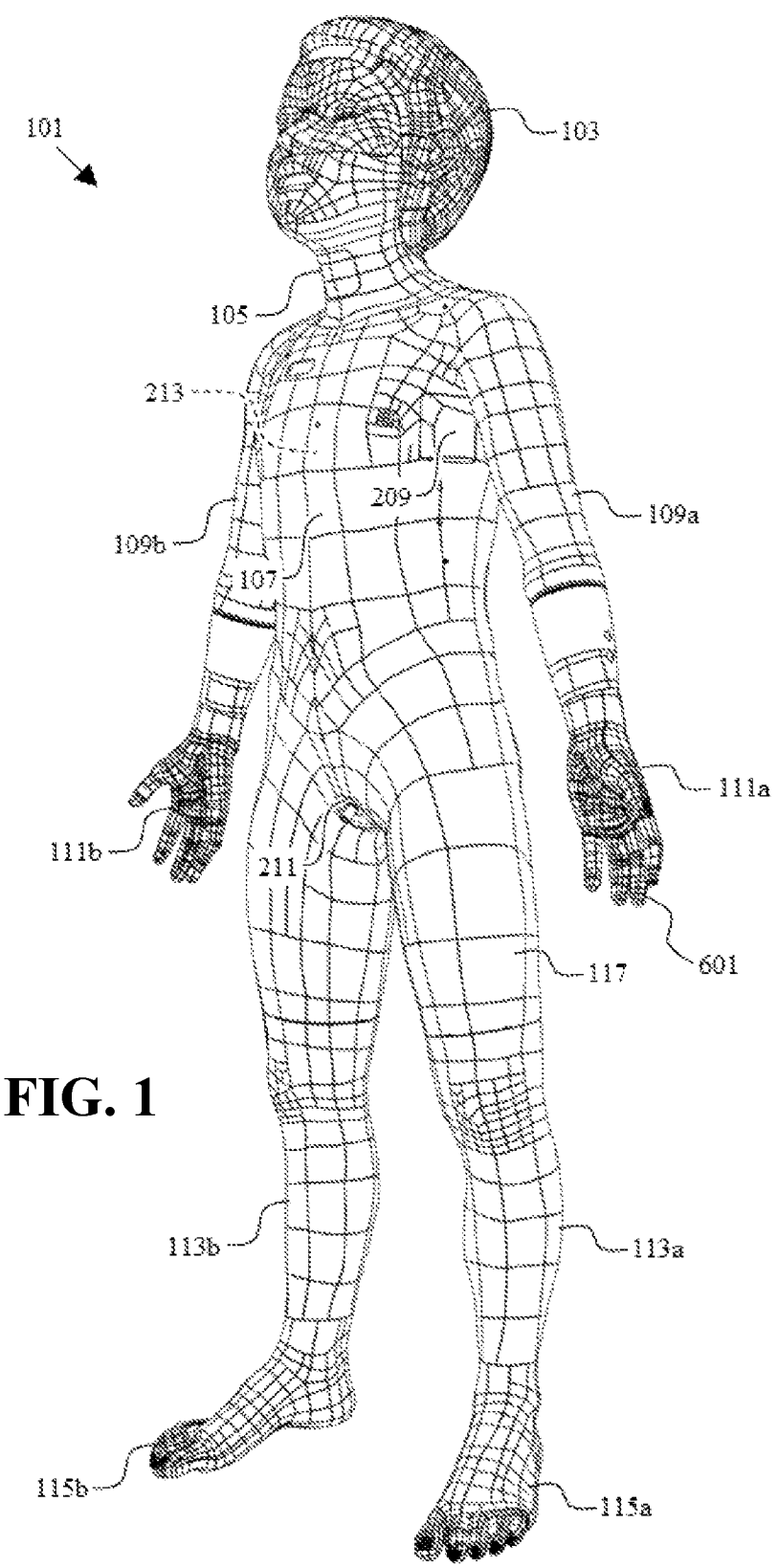
FIG. 1 is a perspective view of a manikin, according to various embodiments of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

One of the aims of healthcare simulation is to establish a teaching environment that closely mimics key clinical cases in a reproducible manner. The introduction of high fidelity tetherless simulators, such as those available from Gaumard Scientific Company, Inc., over the past few years has proven to be a significant advance in creating realistic teaching environments. The present disclosure is directed to an interactive education system for teaching patient care that expands the functionality of the patient simulators by increasing the realism of the look, feel, and functionality of the patient simulators that can be used to train medical personnel in a variety of clinical situations. The interactive education system disclosed herein offers a training platform on which team-building scenarios can be performed for the development of medical treatment skills and the advancement of patient safety.

In particular, the interactive education system disclosed herein may include, or be part of, a patient simulator to provide improved realism and functionality compared to previously available simulators. Some of the various features that facilitate the improved realism and functionality are described in detail below. The interactive education system of the present disclosure allows users to practice a range of different scenarios. Thus, the interactive education system facilitates the training of a user across a broad range of simulated scenarios and corresponding assessment of the user's response to the different simulated scenarios. Accordingly, the user's medical treatment skills can be obtained and/or improved in a simulated environment without endangering a live patient.

In various embodiments, the patient simulator of the present disclosure realistically simulates thoracic, urinary, pulmonary, and/or capillary procedures in a way that replicates a live patient's clinical behavior and is therefore useful for medical educational and diagnostic purposes. To this end, the patient simulator may include a thoracostomy system having a simulated thoracic site on which a simulated thoracostomy procedure can be performed, as described in further detail herein. Further, the patient simulator may include a simulated urinary system having a simulated catheterization site on which a simulated urinary catheterization procedure can be performed, as described in further detail herein. Further still, the patient simulator may include a simulated respiratory system having simulated left and right lungs in communication with a simulated airway system—in combination, the simulated respiratory system and the simulated airway system facilitate a simulated pulmonary procedure, such as, for example a ventilation procedure, as described in further detail herein. Finally, the patient simulator may include a capillary device on which, for example, a simulated finger stick procedure can be performed, as described in further detail herein.

Moreover, in various embodiments, the interactive education system allows for multiple users to simultaneously work with the patient simulator during a particular scenario, thereby facilitating team training and assessment in a realistic, team-based environment. By allowing multiple users to simultaneously interact with the interactive education system, the system facilitates the real-time training and assessment of the cooperative efforts of a team in a wide variety of scenarios, such as, by way of non-limiting example, a fire in the hospital. In various embodiments, the interactive education system provides for pre-operative care simulation as well as post-operative care simulation, thereby allowing users to experience, address, and assess pre-operative and post-operative management, including pre-operative acquisition of the patient history and management of post-operative complications.

For example, in various embodiments, the interactive education system allows for the realistic reception and transport of the patient simulator through a hospital (e.g., from an emergency room to an operating room) during operation of a particular scenario. In addition, the interactive education system can be used to conduct patient safety drills in an actual hospital or other medical setting.

In various embodiments, the interactive education system includes features designed to enhance the educational experience. For example, in various embodiments, the system includes a processing module (e.g., a microprocessor circuit or the like) to simulate different medical and/or surgical scenarios during operation of the interactive education system. In various embodiments, the system includes a camera system that allows visualization of the procedure for real-time video and log capture for debriefing purposes. In various embodiments, the interactive education system is provided with a workbook of medical scenarios that are pre-programmed in an interactive software package, thereby providing a platform on which team-building scenarios can be performed for the development of medical treatment skills and general patient safety. Thus, the interactive education system disclosed herein provides a system that is readily expandable and updatable without large expense and that enables users to learn comprehensive medical and surgical skills through "hands-on" training, without sacrificing the experience gained by users in using standard surgical instruments in a simulated patient treatment situation.

Referring initially to FIG. 1, in some embodiments, the patient simulator system is, includes, or is part of, a manikin 101 in the form of a human body (e.g., a simulated pediatric patient)—the manikin 101 may include a simulated head 103, a simulated neck 105, a simulated torso 107, simulated arms 109a and 109b, simulated hands 111a and 111b, simulated legs 113a and 113b, simulated feet 115a and 115b, and/or simulated skin 117. The simulated neck 105 is connected to the simulated torso 107. The simulated head 103 is connected to the simulated neck 105. The simulated arms 109a and 109b are connected to the simulated torso 107. The respective simulated hands 111a and 111b are connected to the simulated arms 109a and 109b. The simulated legs 113a and 113b are connected to the simulated torso 107. The respective simulated feet 115a and 115b are connected to the simulated legs 113a and 113b. The simulated skin 117 may be part of the simulated head 103, the simulated neck 105, the simulated torso 107, the simulated arms 109a and 109b, the simulated hands 111a and 111b, the simulated legs 113a and 113b, the simulated feet 115a and 115b, and/or any combination thereof.

Figure 2:
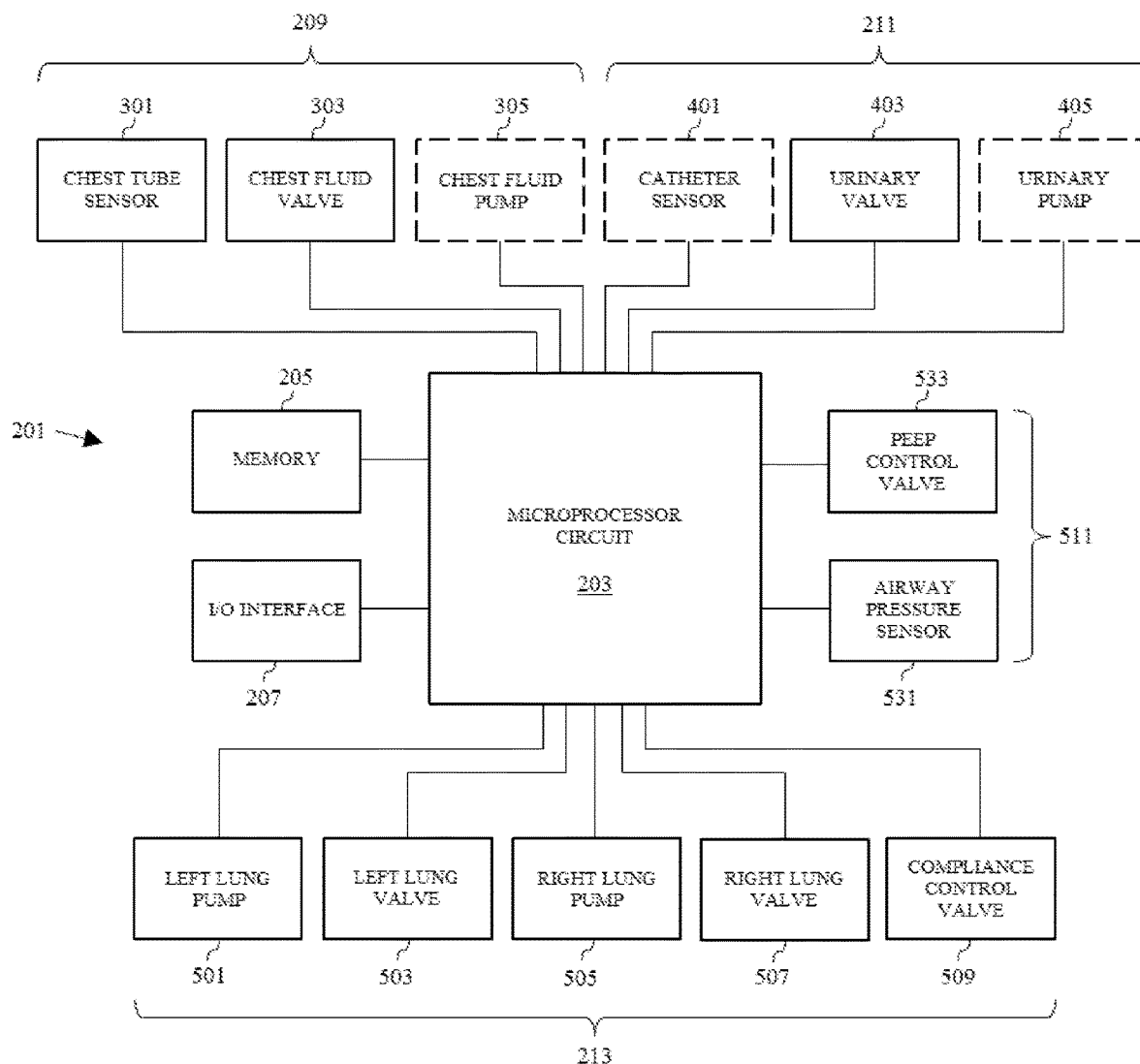
FIG. 2 is a block diagram schematically illustrating a patient simulator, which may be implemented at least in part within the environment and/or the manikin of FIG. 1, according to various embodiments of the present disclosure.

Turning also to FIG. 2, with continuing reference to FIG. 1, a block diagram of the patient simulator according to some embodiments of the present disclosure is schematically illustrated and generally referred to by the reference numeral 201. The patient simulator 201 may be implemented (at least in part) within the environment and/or the manikin 101 of FIG. 1. The patient simulator 201 includes a microprocessor circuit (or microcontroller) 203, an electronic memory 205, and an input/output ("I/O") interface 207. The microprocessor circuit 203 may include an integrated circuit (e.g., ASIC), and may be programmed with appropriate software to allow and enable the simulated features of the patient simulator 201. The I/O interface 207 may include, or facilitate communication with, peripheral input devices like a keyboard, mouse and joystick, and output devices such as a display, speakers, and a printer. The microprocessor circuit 203 may exchange information with connected components (internal and external) by using a Universal Serial Bus (USB), a one-wire RS-232 communication interface, or an I2C communication interface.

In some embodiments of the patient simulator 201, one of which is shown implemented (at least in part) within the environment and/or the manikin 101 of FIG. 1, the patient simulator 201 includes one, or a combination, of the following: a thoracostomy system 209, a simulated urinary system 211, and/or a simulated respiratory system 213. The microprocessor circuit 203 may be configured to be in electronic communication with respective components of the thoracostomy system 209, the simulated urinary system 211, and/or the simulated respiratory system 213, as shown in FIG. 2. More particularly, the microprocessor circuit 203 may be configured to monitor, or control, the thoracostomy system 209, the simulated urinary system 211, and/or the simulated respiratory system 213 via said electronic communication.

Figure 3:
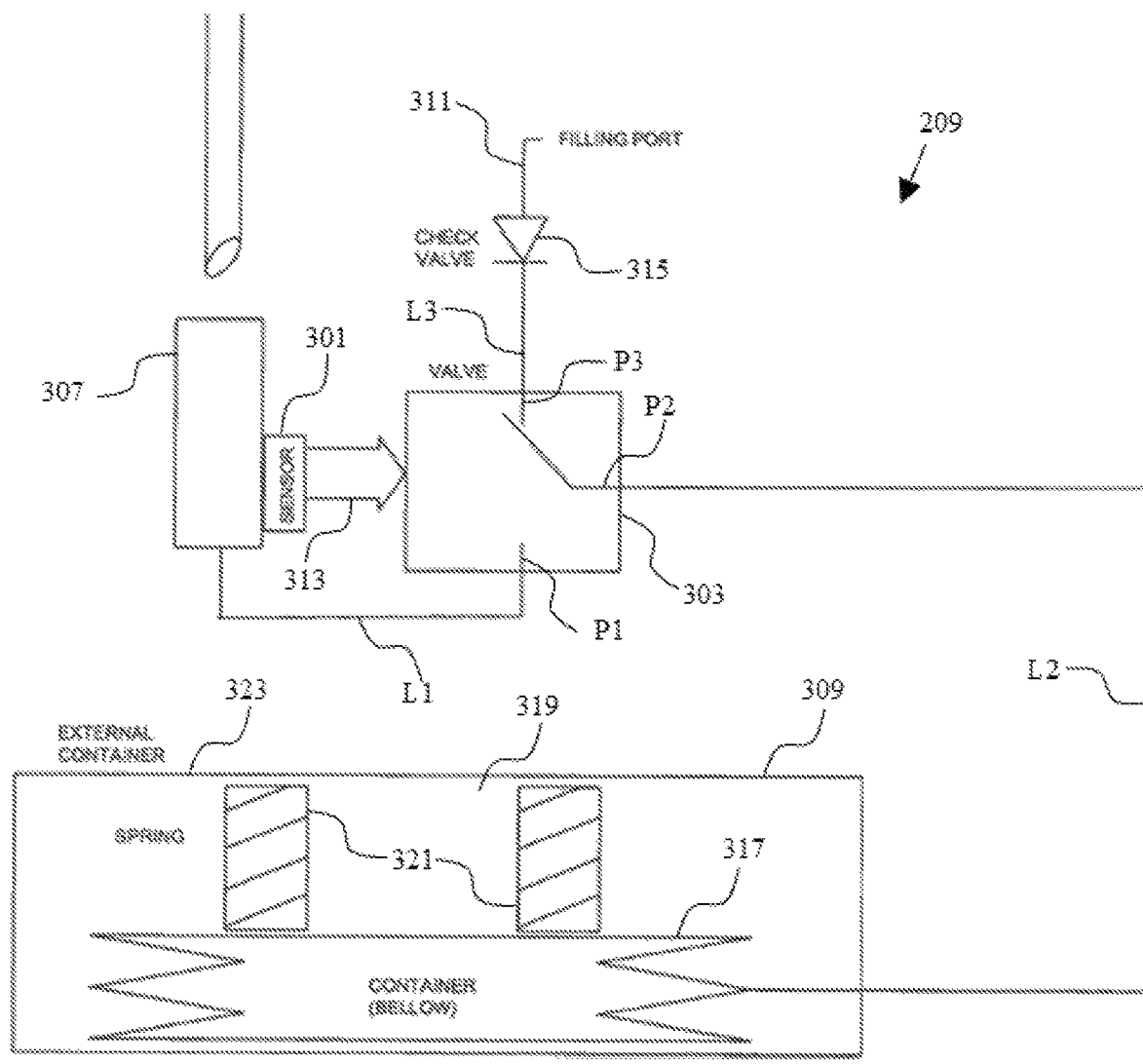
FIG. 3 is a block diagram schematically illustrating a thoracostomy system, which may be implemented at least in part within the manikin, the patient simulator, and/or the respective environments of FIGS. 1 and 2, the thoracostomy system including, inter alia, a simulated thoracic site, according to various embodiments of the present disclosure.

In some embodiments, as shown in FIG. 2, the thoracostomy system 209 includes one, or a combination, of the following: a chest tube sensor 301, a chest fluid valve 303, and/or a chest fluid pump 305, each configured for electronic communication with the microprocessor circuit 203. For example, turning to FIG. 3, with continuing reference to FIG. 2, in at least one such embodiment, the thoracostomy system 209 includes the chest tube sensor 301 and the chest fluid valve 303, but not the chest fluid pump 305. As shown in FIG. 3, the thoracostomy system 209 may also include a simulated thoracic site 307, a chest fluid reservoir 309, and a filling port 311. The simulated thoracic site 307 is configured for insertion of a chest tube, as described in further detail herein. The chest tube sensor 301 is operably coupled to the simulated thoracic site 307 and configured to detect insertion of the chest tube. In addition to, or instead of, being configured for electronic communication with the microprocessor circuit 203, the chest tube sensor 301 may be configured for electronic communication directly with the chest fluid valve 303, as indicated by arrow 313 in FIG. 3.

The chest fluid valve 303 includes fluid ports P1, P2, and P3. The port P1 of the chest fluid valve 303 is in fluid communication, via a flow path L1, with the simulated thoracic site 307. The port P2 of the chest fluid valve 303 is in fluid communication, via a flow path L2, with the chest fluid reservoir 309. The port P3 of the chest fluid valve 303 is in fluid communication, via a flow path L3, with the filling port 311. The flow path L3 includes a check valve 315 configured to allow fluid communication from the filling port 311 to the port P3 of the chest fluid valve 303, but to prevent reverse fluid communication from the port P3 of the chest fluid valve 303 to the filling port 311. The chest fluid valve 303 is configurable between a first configuration, in which the port P1 communicates with the port P2, but not the port P3, and a second configuration, in which the port P2 communicates with the port P3, but not the port P1.

In some embodiments, as shown in FIG. 3, the chest fluid reservoir 309 includes an expandable vessel 317 (e.g., an accordion- or bellows-type bag) enclosed within an expansion chamber 319. The expandable vessel 317 is configured to be filled with simulated pleural fluid via the filling port 311, and is actuable between a fully-collapsed (or empty) state and a fully-expanded (or full) state within the expansion chamber 319. The expansion chamber 319 contains one or more biasing members 321 (e.g., springs, gas pistons, or the like) configured to bias the expandable vessel 317 towards the fully-collapsed state. In some embodiments, conical or tapered springs are used to reduce the overall space required for the chest fluid reservoir 309. In addition to, or instead of, the one or more biasing members 321, the expandable vessel 317 may be configured to bias itself towards the fully-collapsed state. The expansion chamber 319 may be defined at least in part by a housing 323 (e.g., made of urethane)—in some embodiments, the housing 323 includes two pieces of urethane sealed tightly together so as to withstand the fluid pressure within the expandable vessel 317. This facilitates realistic simulation of blood gushing out of a thoracic incision in a manner similar to what might be observed during an actual thoracostomy surgery.

In operation, a chest tube is insertable into the simulated thoracic site 307 to realistically simulate a thoracostomy procedure. The chest tube sensor 301 is configured to detect when the chest tube has been fully inserted into the simulated thoracic site 307. Before the chest tube is fully inserted into the simulated thoracic site 307, the chest fluid valve 303 defaults to the second configuration in which the port P2 communicates with the port P3, but not the port P1. When the chest fluid valve 303 is in the second configuration, the check valve 315 prevents communication of simulated pleural fluid from the expandable vessel 317 to the filling port 311, but allows communication of simulated pleural fluid from the filling port 311 to the expandable vessel 317. Thus, the filling port 311 may be used to fill the expandable vessel 317 with simulated pleural fluid while the check valve 315 prevents, or at least reduces, simulated pleural fluid from spilling out of the filling port 311.

Once the chest tube sensor 301 detects full insertion of the chest tube into the simulated thoracic site 307, the chest tube sensor 301 communicates an electrical signal that causes the chest fluid valve 303 to be actuated to the first configuration in which the port P1 communicates with the port P2, but not the port P3. Thus, the chest tube sensor 301 is used as a triggering device that signals the microprocessor circuit 203 (or the chest fluid valve 303 directly) to actuate the chest fluid valve 303 to the first configuration. When the chest fluid valve 303 is in the first configuration, the biasing members 321 urge simulated pleural fluid out of the expandable vessel 317, through the flow path L2, the chest fluid valve 303 (via the ports P1 and P2), and the flow path L1, and into the fully-inserted chest tube. Thus, the thoracostomy system 209 is operated by precisely controlling the configuration of the chest fluid valve 303, along with the amount of fluid contained within the chest fluid reservoir 309.

In some embodiments, the thoracostomy system 209 can be used to realistically simulate pneumothorax, which is the accumulation of air or gas in the pleural space. In some embodiments, the thoracostomy system 209 can be used to realistically simulate pleural effusion, which is the accumulation of liquid in the pleural space—the liquid could be lymphatic fluid (i.e., chylothorax), blood (i.e., hemothorax), serous fluid (i.e., hydrothorax), or a pyogenic infection of the pleural space. More particularly, the thoracostomy system 209 may be operable to realistically simulate the drainage of pleural effusion, which, in excess, can impair breathing by limiting expansion of the lung(s). The causes of pleural effusion are numerous, and may include, inter alia, congestive heart failure, collapsed lung(s), liver cirrhosis, trauma, empyema (i.e., collection of pus in the pleural space), parapneumonic effusion due to pneumonia, cancer (i.e., lung cancer, breast cancer, or lymphoma), viral infection, and/or pulmonary embolism.

Figure 4:
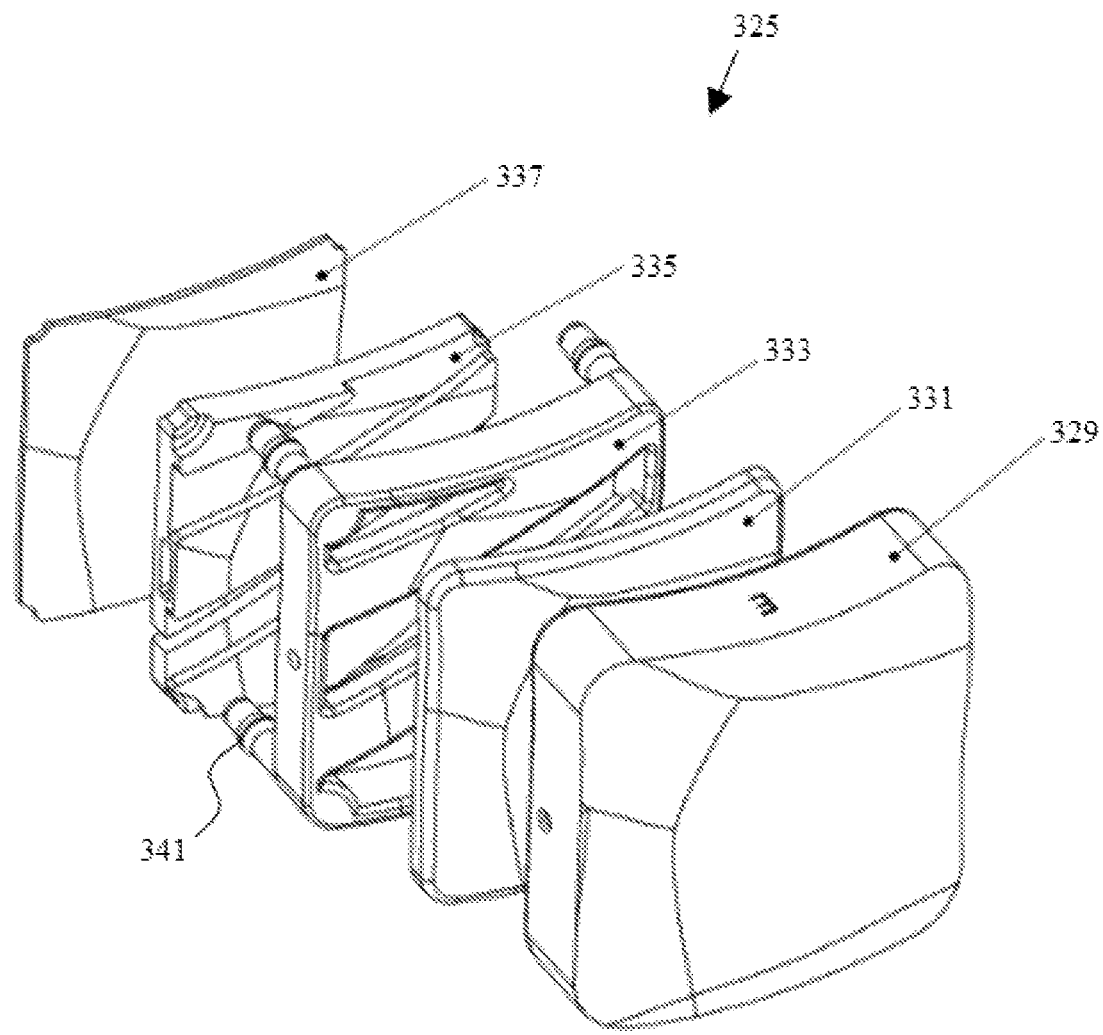
FIG. 4 is an exploded perspective view of a portion of the simulated thoracic site of FIG. 3, according to various embodiments of the present disclosure.
Figure 5:
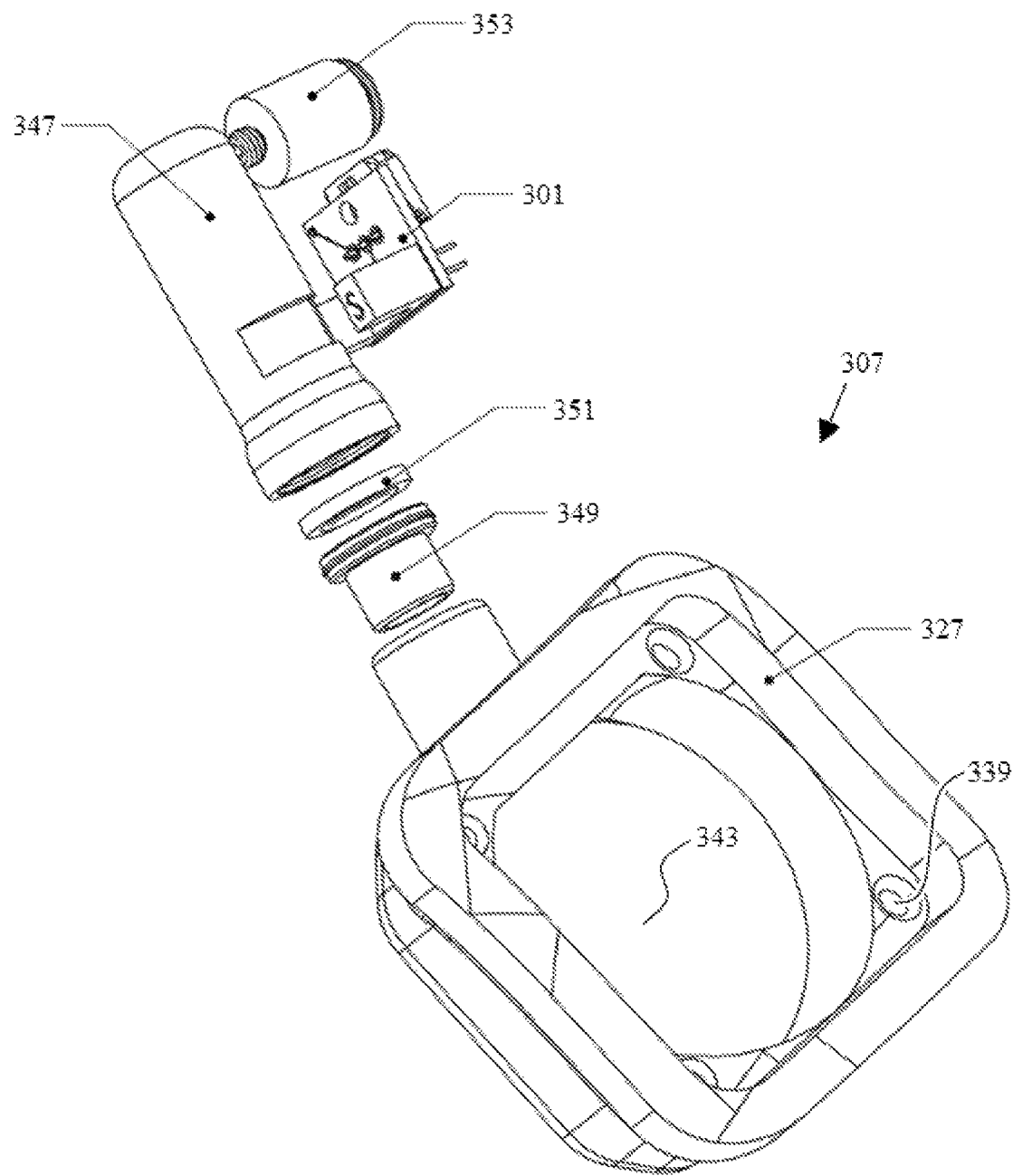
FIG. 5 is an exploded perspective view of another portion of the simulated thoracic site of FIG. 3, according to various embodiments of the present disclosure.
Figure 6:
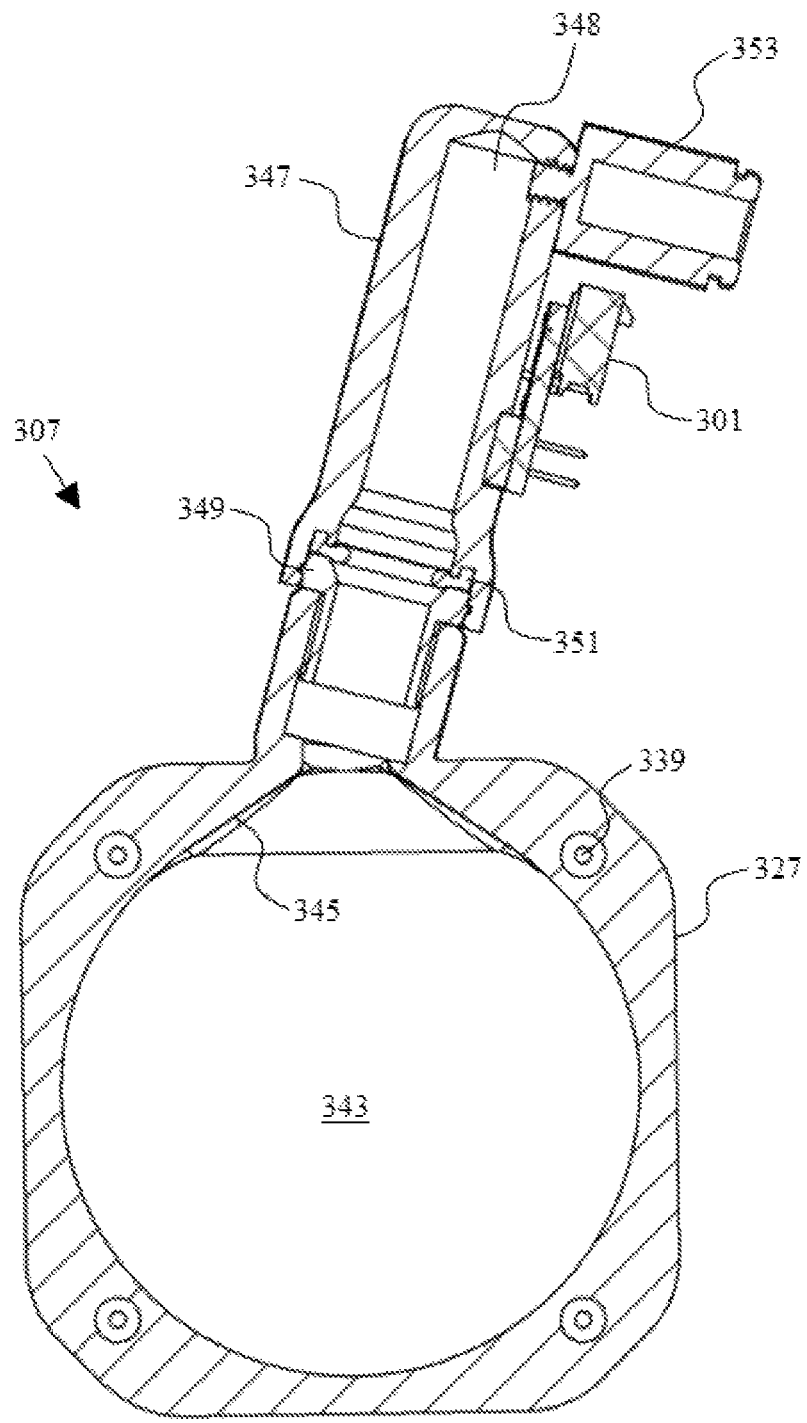
FIG. 6 is a cross sectional view of the simulated thoracic site of FIG. 5, according to various embodiments of the present disclosure.

Referring to FIGS. 4-6, in some embodiments, the simulated thoracic site 307 includes an insert 325 and a support housing 327. The insert 325 is configured to be detachably operably coupled, or connected, to the support housing 327. In some embodiments, the support housing 327 is "floated" during the injection molding procedure to ensure proper orientation within the simulated skin 117 of the simulated torso 107. The insert 325 includes a skin layer 329, adipose tissue 331, a ribs layer 333 (e.g., made out of urethane), endothoracic fascia 335 (e.g., able to hold fluid) (which may also be referred to as "intercostal muscle", "red muscle", "muscle layer", or the like), and a pleura cavity 337. In some embodiments, the skin layer 329 is, includes, or is part of, the simulated skin 117 of the patient simulator system 10. The skin layer 329 defines a pocket that receives at least one, or a combination of the following: the adipose tissue 331, the ribs layer 333, the endothoracic fascia 335, and/or the pleura cavity 337. In some embodiments, the skin layer 329 acts as a container to hold the other layers together. In some embodiments, the skin layer 329 may include a rim around the outside to promote a better fit with the support housing 327.

The adipose tissue 331, the ribs layer 333, and the endothoracic fascia 335 are sandwiched between the skin layer 329 and the pleura cavity 337, and the ribs layer 333 is sandwiched between the adipose tissue 331 and the endothoracic fascia 335. The ribs layer 333 may be constructed so as to be palpitated though the skin layer 329 and the adipose tissue 331. The adipose tissue 331 engages the skin layer 329, and the endothoracic fascia 335 engages the pleura cavity 337. The endothoracic fascia 335 (or red muscle layer) may be constructed with a small pocket into which a user may introduce simulated blood through the use of a syringe and needle—a small mark may be made on a side of the skin layer 329 to indicate where to introduce the simulated blood. The pleura cavity 337 may be constructed using a combination of a mesh fabric embedded into clear silicone, and may include parietal pleura and visceral pleura. In some embodiments, the insert 325 bleeds when cut between the ribs layer 333 on the midaxillary line of the simulated torso 107, allowing the escape of fluid and/or trapped air.

In some embodiments, as shown in FIGS. 5 and 6, the support housing 327 includes locking cavities 339 configured to lock the insert 325 in place by receiving anchoring legs 341 (shown in FIG. 4) extending, for example, from the ribs layer 333 of the insert 325. The cavities 339 may create a friction locking mechanism with the anchoring legs 341 to prevent dislodgement of the insert 325 from the support housing 327 during the simulated thoracostomy procedure. The support housing 327 also includes an internal chamber 343 that provides empty space behind the insert 325 for a user to check for the pleural space during the simulated thoracostomy procedure to confirm that the chest tube is ready to be inserted. In some embodiments, the internal chamber 343 is round or cylindrical in shape to allow the user to insert a finger and check for the surrounding area of the pleural space. The support housing 327 also includes a funnel 345 adjacent the internal chamber 343 and configured to guide the chest tube towards the chest tube sensor 301 as the chest tube is inserted through an incision made by the user in the insert 325.

The thoracostomy system 209 also includes a sensor mount 347 to which the chest tube sensor 301 is mounted—the sensor mount 347 includes an internal passage 348 that is in fluid communication with the port P1 of the chest fluid valve 303 (shown in FIG. 3). In some embodiments, the sensor mount 347 is a plastic tube having the chest tube sensor 301 mounted to the outside thereof. As shown in FIGS. 5 and 6, the sensor mount 347 is operably coupled to the support housing 327 adjacent the funnel 345 via, for example, a sensor mount barb 349 so that the chest tube is insertable through the insert 325, the internal chamber 342, and the funnel 345, and into the internal passage 348. The sensor mount 347 is equipped with a sealing ring 351 positioned adjacent the internal passage 348 and configured to seal against the chest tube when the chest tube is inserted into the internal passage 348. As a result, the sealing ring 351 facilitates the flow of simulated pleural fluid from the expandable vessel 317 into the fully-inserted chest tube by preventing, or at least reducing, migration of the simulated pleural fluid from the internal passage 348, around the outside of the chest tube, and into the internal chamber 343 of the support housing 327. Once the chest tube has been inserted far enough into the internal passage 348, the chest fluid valve 303 is triggered into the first configuration by the chest tube sensor 301. As previously described, triggering of the chest fluid valve 303 into the first configuration causes simulated pleural fluid to flow out of the expandable vessel 317, through the flow path L2, the chest fluid valve 303 (via the ports P1 and P2), and the flow path L1, and into the fully-inserted chest tube. In some embodiments, the sensor mount 347 includes a quick-disconnect fitting 353.

In addition to, or instead of, the chest fluid valve 303, the thoracostomy system 209 may include the chest fluid pump 305—in such embodiments, the chest fluid pump 305 may draw fluid actively out of the chest fluid reservoir 309, thus decreasing, or eliminating, the need for the biasing member(s) 321 in the chest fluid reservoir 309. The chest fluid pump 305 may be a peristaltic pump. Moreover, in addition to, or instead of, the chest tube sensor 301, the thoracostomy system 209 may include a check valve in the form of the duck bill or flapper valve combined with a membrane seal, similar to that described below in relation to the simulated urinary system 211.

Figure 7:
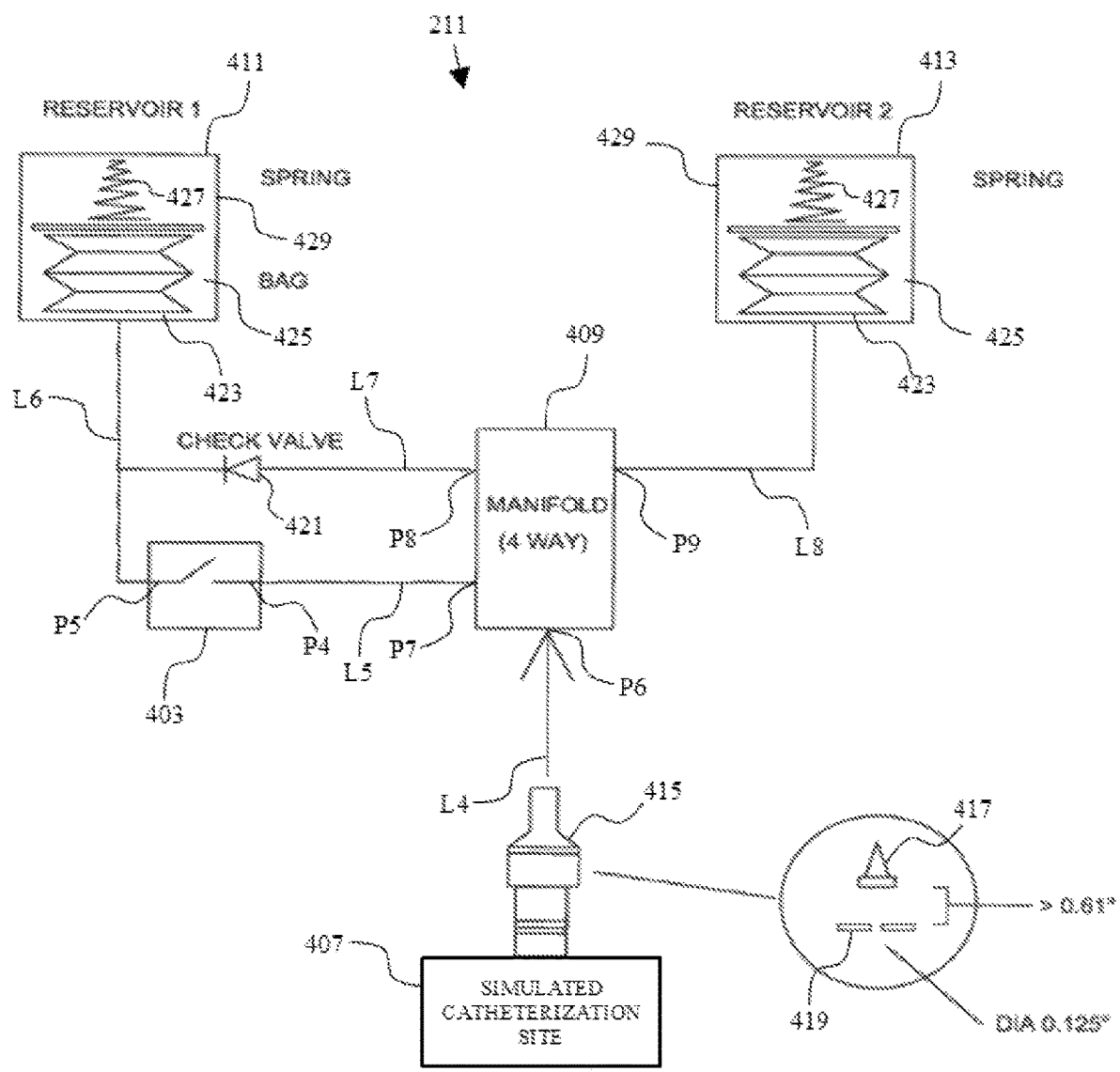
FIG. 7 is a block diagram schematically illustrating a simulated urinary system, which may be implemented at least in part within the manikin, the patient simulator, and/or the respective environments of FIGS. 1 and 2, according to various embodiments of the present disclosure.

Referring back again to FIG. 2, in some embodiments, the simulated urinary system 211 includes one, or a combination, of the following: a catheter sensor 401, a urinary valve 403, and/or a urinary pump 405, each configured for electronic communication with the microprocessor circuit 203. For example, turning to FIG. 7, with continuing reference to FIG. 2, in at least one embodiment, the simulated urinary system 211 includes the urinary valve 403, but not the catheter sensor 401 or the urinary pump 405. As shown in FIG. 7, the simulated urinary system 211 may also include a simulated catheterization site 407, a urinary manifold 409, and a pair of urinary fluid reservoirs 411 and 413. The simulated catheterization site 407 is configured for insertion of a urinary catheter therethrough, and may take the form of either a male or a female urethral opening. The simulated urinary system 211 also includes a check valve 415 operably coupled to the simulated catheterization site 407—the check valve 415 may take the form of a duck bill or flapper valve 417 combined with a membrane seal 419, as shown in FIG. 7. The check valve 415 is configured to permit insertion of the urinary catheter while preventing back-flow of simulated urinary fluid, as described in further detail herein.

The urinary valve 403 includes fluid ports P4 and P5, and is actuable between an open configuration, in which the fluid ports P4 and P5 are in fluid communication, and a closed configuration, in which the fluid ports P4 and P5 are not in fluid communication. The urinary manifold 409 includes fluid ports P6, P7, P8 and P9, each of which is in fluid communication with the others. The port P6 of the urinary manifold 409 is in fluid communication, via a flow path L4, with the check valve 415. The port P7 of the urinary manifold 409 is in fluid communication, via a flow path L5, with the port P4 of the urinary valve 403. The port P5 of the urinary valve 403 is in fluid communication, via a flow path L6, with the urinary fluid reservoir 411. The port P8 of the urinary manifold 409 is in fluid communication, via a flow path L7, with the flow path L6 extending between the port P5 of the urinary valve 403 and the urinary fluid reservoir 411. The flow path L7 includes a check valve 421 configured to allow fluid communication from the port P8 of the urinary manifold 409 to the flow path L6, but to prevent reverse fluid communication from the flow path L6 to the port P8 of the urinary manifold 409. The port P9 of the urinary manifold 409 is in fluid communication, via a flow path L8, with the urinary fluid reservoir 413.

In some embodiments, one of which is shown in FIG. 7, the urinary fluid reservoirs 411 and 413 each include an expandable vessel 423 (e.g., an accordion- or bellows-type bag) enclosed within an expansion chamber 425. The expandable vessels 423 are configured to be filled with simulated urinary fluid via, inter alia, the check valve 415, and are actuable between fully-collapsed (or empty) states and fully-expanded (or full) states within the respective expansion chambers 425. The expansion chambers 425 each contain one or more biasing members 427 (e.g., springs, gas pistons, or the like) configured to bias the respective expandable vessels 423 towards the fully-collapsed state. In some embodiments, conical or tapered springs are used to reduce the overall space required for the urinary fluid reservoirs 411 and 413. In addition to, or instead of, the one or more biasing members 427, at least one of the expandable vessels 423 may be configured to bias itself towards the fully-collapsed state. The expansion chambers 425 may each be defined at least in part by a housing 429 (e.g., made of urethane)—in some embodiments, the housings 429 each include two pieces of urethane sealed tightly together so as to withstand the fluid pressure within the respective expandable vessels 423. This facilitates the simulation of urine gushing out of a urethral opening in a manner similar to what might be observed during an actual urinary catheterization procedure.

In operation, a urinary catheter is insertable into the simulated catheterization site 407 to realistically simulate a urinary catheterization procedure. The check valve 415 is configured to receive the urinary catheter once the urinary catheter has been fully inserted into the simulated catheterization site 407. Before the urinary catheter is received by the check valve 415, the urinary valve 403 defaults to the closed configuration, in which the fluid ports P4 and P5 are not in fluid communication. When the urinary valve 403 is in the closed configuration, the urinary valve 403 prevents communication of simulated urinary fluid from the urinary fluid reservoir 411 to the port P7 of the urinary manifold 409, and the check valve 421 prevents communication of simulated urinary fluid from the urinary fluid reservoir 411, via the flow path L7, to the port P8 of the urinary manifold 409. As a result, when the urinary valve 403 is in the closed configuration, communication of simulated urinary fluid from the urinary fluid reservoir 411 to the urinary manifold 409 (and thus the check valve 415) is not permitted. On the other hand, communication of simulated urinary fluid from the check valve 415 to the urinary fluid reservoir 411 (e.g., to fill the urinary fluid reservoir) is permitted via the check valve 421—the check valve 415 may thus be used to fill the fluid reservoir 411 (and the fluid reservoir 413) with simulated urinary fluid when the urinary valve 403 is in the closed configuration.

In order to be received by the check valve 415, in some embodiments, the urinary catheter must extend through the membrane seal 419 and at least partially into the duck bill or flapper valve 417. That is, the urinary catheter must breach the duck bill or flapper valve 417 to allow the flow of simulated urinary fluid therethrough. Once the urinary catheter has been received by the check valve 415, the urinary fluid reservoir 413 is permitted to release an initial surge of simulated urinary fluid into the urinary catheter. More particularly, the biasing member 427 of the fluid reservoir 413 urges simulated urinary fluid out of the expandable vessel 423, through the flow path L8, the urinary manifold 409 (via the ports P6 and P9), and the flow path L4, and into the fully-inserted urinary catheter. Since the urinary valve 403 defaults to the closed configuration, in which the fluid ports P4 and P5 are not in fluid communication, the urinary valve 403 and the check valve 421 together prevent the urinary fluid reservoir 411 from also releasing simulated urinary fluid into the urinary catheter.

After the initial surge of simulated urinary fluid is released from the urinary fluid reservoir 413 into the urinary catheter, the urinary valve 403 may be actuated to the open configuration, in which the fluid ports P4 and P5 are in fluid communication, to permit the release of additional simulated urinary fluid from the urinary fluid reservoir 411 into the urinary catheter. Opening the urinary valve 403 allows the biasing member 427 of the fluid reservoir 411 to urge simulated urinary fluid out of the expandable vessel 423, through the flow path L6, the urinary valve 403 (via the ports P4 and P5), the flow path L5, the urinary manifold 409 (via the ports P6 and P7), and the flow path L4, and into the fully-inserted urinary catheter. In some embodiments, the urinary valve 403 is not opened until after the urinary fluid reservoir 413 has been substantially emptied. The urinary valve 403 may be used as a metering device to control the release of simulated urinary fluid from the urinary reservoir 411 into the urinary catheter. The microprocessor circuit 203 may be used to actuate the urinary valve 403 to between the open and closed configurations. Thus, the simulated urinary system 211 is operated by precisely controlling the configuration of the urinary valve 403, along with the amount of fluid contained within the urinary fluid reservoirs 411 and 413. In some embodiments, following the initial surge of simulated urinary fluid, additional simulated urinary fluid is output at a metered rate from the urinary reservoir 411—this rate can be determined by an instructor and effected by controlling the urinary valve 403 with the microprocessor circuit 203.

In some embodiments, the simulated urinary system 211 can be used to realistically simulate acute urinary retention or post-operative urinary retention, which is a medical emergency in which the bladder can stretch to an enormous size—tearing of the bladder can occur if this situation is not dealt with quickly and properly. Once the bladder distends far enough, the patient experiences significant pain. Such an increase in bladder pressure can prevent urine from entering the ureters, and may even cause urine to flow back up through the ureters and into the kidneys, which can cause hydronephrosis, kidney failure, and sepsis. There is also an increased risk of urinary tract infection.

In addition to, or instead of, the urinary valve 403, the simulated urinary system 211 may include the urinary pump 405—in such embodiments, the urinary pump 405 may draw fluid actively out of one, or both, of the urinary fluid reservoirs 411 and 413, thus decreasing, or eliminating, the need for the biasing member(s) 427. The urinary pump 405 may be a peristaltic pump. Moreover, in one such embodiment, in addition to, or instead of, the check valve 415, the simulated urinary system 211 may include the catheter sensor 401 operable in conjunction with a valve to initiate the flow of simulated urinary fluid in a manner to similar to that described herein in relation to the thoracostomy system 209.

Figure 8:
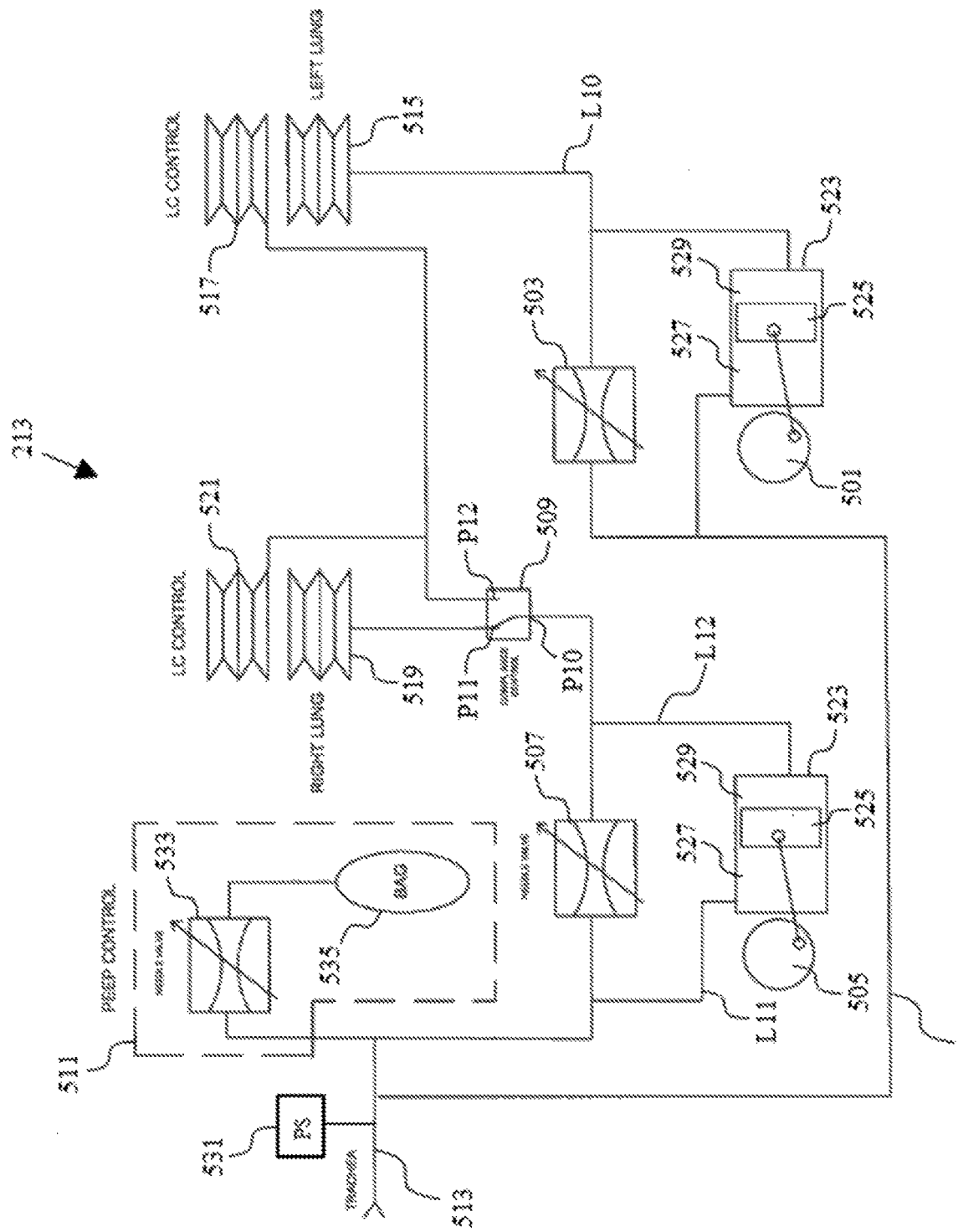
FIG. 8 is a block diagram schematically illustrating a simulated respiratory system, which may be implemented at least in part within the manikin, the patient simulator, and/or the respective environments of FIGS. 1 and 2, according to various embodiments of the present disclosure.

Referring back again to FIG. 2, in some embodiments, the simulated respiratory system 213 includes one, or a combination, of the following: a left lung pump 501, a left lung valve 503, a right lung pump 505, a right lung valve 507, a compliance control valve 509, and/or a positive end-expiratory pressure ("PEEP") control system 511, each configured for electronic communication with the microprocessor circuit 203. For example, turning to FIG. 8, with continuing reference to FIG. 2, in at least one embodiment, the simulated respiratory system 213 includes the combination of:

the left lung pump 501, the left lung valve 503, the right lung pump 505, the right lung valve 507, the compliance control valve 509, and the PEEP control system 511. As shown in FIG. 8, the simulated respiratory system 213 may also include a simulated airway system 513, a simulated left lung 515, a left lung compliance reservoir 517, a simulated right lung 519, and a right lung compliance reservoir 521. The left and right lung compliance reservoirs 517 and 521 are positioned adjacent the simulated left and right lungs 515 and 519, respectively—as a result, the volume of the left and right lung compliance reservoirs 517 and 521 can be adjusted to change the lung compliance of the simulated left and right lungs 515 and 519, as described in further detail herein. In various embodiments, at least one, or a combination, of the following may be, include, or be part of an accordian- or bellows-type bag: the simulated left lung 515, the left lung compliance reservoir 517, the simulated right lung 519, and/or the right lung compliance reservoir 521.

The left and right lung pumps 501 and 505 each include a cylinder 523 and a piston 525 dividing the cylinder 523 into chambers 527 and 529. During the respective upward strokes of the pistons 525 (from right to left as viewed in FIG. 8), the left and right lung pumps 501 and 505 generate positive pressure in the respective chambers 527 and negative (vacuum) pressure in the respective chambers 529. Conversely, during the downward stroke of the piston 525 (from left to right as viewed in FIG. 8), the left and right lung pumps 501 and 505 generate negative (vacuum) pressure in the respective chambers 527 and positive pressure in the respective chambers 529.

The chamber 527 of the left lung pump 501 is in fluid communication, via a flow path L9, with the simulated airway system 513, and the chamber 529 of the left lung pump 501 is in fluid communication, via a flow path L10, with the simulated left lung 515. The left lung valve 503 is configurable to communicate fluid from the flow path L9 to the flow path L10, or vice versa—as a result, using the left lung valve 503, air flow may be permitted to bypass the left lung pump 501 from the simulated airway system 513 to the simulated left lung 515, or vice versa. Similarly, the chamber 527 of the right lung pump 505 is in fluid communication, via a flow path L11, with the simulated airway system 513, and the chamber 529 of the right lung pump 505 is in fluid communication, via a flow path L12, with the simulated right lung 519. The right lung valve 507 is configurable to communicate fluid from the flow path L11 to the flow path L12, or vice versa—as a result, using the right lung valve 507, air flow may be permitted to bypass the right lung pump 505 from the simulated airway system 513 to the simulated right lung 519, or vice versa. The controlled bypassing of the left and right lung pumps 501 and 505 using the respective left and right lung valves 503 and 507 is useful for actuating the simulated respiratory system 213 between a spontaneous breathing configuration and an assisted breathing configuration, as described in further detail herein.

The compliance control valve 509 includes fluid ports P10, P11, and P12, and is actuable between a first configuration, in which the port P10 communicates with the port P11, but not the port P12, and a second configuration, in which the port P10 communicates with the port P12, but not the port P11. The port P10 is in fluid communication with the chamber 529 of the right lung pump 505 via at least a first part of the flow path L12, and the port P11 is in fluid communication with the simulated right lung 519 via at least a second part of the flow path L12. Thus, when the compliance control valve 509 is in the first configuration, in which the port P10 communicates with the port P11, but not the port P12, the compliance control valve 509 forms at least a third part of the flow path L12. The port P12 of the compliance control valve 509 may be in fluid communication with both of the left and right lung compliance reservoirs 517 and 521—in such embodiments, when the compliance control valve 509 is in the second configuration, in which the port P10 communicates with the port P12, but not the port P11, the chamber 529 of the right lung pump 505 is in fluid communication with both of the left and right lung compliance reservoirs 517 and 521. The right lung pump 505 is thus operable, when the compliance control valve 509 is in the second configuration, to change the lung compliance of the simulated left and right lungs 515 and 519 by adjusting the volume of air within the left and right lung compliance reservoirs 517 and 521.

In addition to, or instead of, the compliance control valve 509 forming a part of the flow path L12, the compliance control valve 509 (or another compliance control valve) may form a part of the flow path L10 so that the left lung pump 501 is operable to change the lung compliance of one, or both, of the simulated left and right lungs 515 and 519. In those embodiments including both compliance control valves, the left and right lung pumps 501 and 505 may be configured to communicate jointly, or separately, with the respective left and right lung compliance reservoirs 517 and 521. For example, in one such embodiment, the left lung pump 501 is operable to change the lung compliance of the simulated left lung 515 by adjusting the volume of air within the left lung compliance reservoir 517, and the right lung pump 505 is operable to change the lung compliance of the simulated right lung 519 by adjusting the volume of air within the right lung compliance reservoir 521.

In some embodiments, the simulated airway system 513 is configured for insertion of one or more tracheal intubation devices. In some embodiments, the simulated airway system 513 may include a trachea tubing depth sensor operably coupled to a simulated trachea to ensure proper execution of various intratracheal training procedures. In some embodiments, the simulated airway system 513 is shaped to facilitate a training procedure for the insertion and placement of a laryngeal mask airway adjacent the simulated trachea and/or a simulated esophagus. In some embodiments, the simulated airway system 513 is shaped to facilitate a training procedure for nasotracheal intubation. In some embodiments, the simulated airway system 513 is shaped to facilitate a training procedure for the insertion and placement of a nasogastric feeding tube. In some embodiments, the simulated respiratory system 213 and the simulated airway system 513, in combination, enable realistic pulmonary feedback during various training procedures, such as, for example, a training procedure for endotracheal intubation, a training procedure for a valve bag mask ventilation, or another training procedure described herein.

To place the simulated respiratory system 213 in the spontaneous breathing configuration, the left and right lung valves 503 and 507 are closed, and the compliance control valve 509 is actuated to the first configuration, in which the port P10 communicates with the port P11, but not the port P12. Accordingly, each downward stroke of the left lung pump 501's piston 525 forces air from the chamber 529 into the simulated left lung 515 via the flow path L10, and produces a negative (vacuum) pressure in the airway system 513; and each upward stroke of the left lung pump 501's piston 525 draws air out of the simulated left lung 515 into the chamber 529 via the flow path L10 and produces a positive pressure in the airway system 513. Similarly, when the compliance control valve 509 is in the first configuration, in which the port P10 communicates with the port P11, but not the port P12, each downward stroke of the right lung pump 505's piston 525 forces air from the chamber 529 into the simulated right lung 519 via the flow path L12, and produces a negative (vacuum) pressure in the airway system 513; and each upward stroke of the right lung pump 505's piston 525 draws air out of the simulated right lung 519 into the chamber 529 via the flow path L12 and produces a positive pressure in the airway system 513. As a result, the upward and downward strokes of the respective pistons 525 of the left lung pump 501 and the right lung pump 505 (i.e., when the compliance control valve 509 is in the first configuration) simulate the rise and fall of a patient's chest cavity, and cause the airway system 513 to inhale and exhale in a manner that simulates a patient's breathing pattern. The respiratory rate at which each of left and right lung pumps 501 and 505 is driven may be controlled individually by the microprocessor circuit 203.

To place the simulated respiratory system 213 in the assisted breathing configuration, the left and right lung valves 503 and 507 are at least partially opened, and the compliance control valve 509 is actuated to the first configuration, in which the port P10 communicates with the port P11, but not the port P12. The simulated airway system 513 is placed in communication with a ventilator. The partial opening of the left and right lung valves 503 and 507 causes the upward and downward strokes of the respective pistons 525 of the left and right lung pumps 501 and 505 to produce a pressure fluctuation in the airway system 513 that simulates a patient gasping for breath. This pressure fluctuation can be sensed by the ventilator operably coupled to the airway system 513, which ventilator is then activated to assist (i.e., ventilate) the simulated respiratory system 213.

More particularly, each downward stroke of the left lung pump 501's piston 525 produces a negative (vacuum) pressure in the airway system 513 while permitting the escape of air from the fluid line L10 to the airway system 513 via the partially opened left lung valve 503; and each upward stroke of the left lung pump 501's piston 525 produces a positive pressure in the airway system 513 while permitting the escape of air from the airway system 513 to the fluid line L10 via the partially opened left lung valve 503. Similarly, each downward stroke of the right lung pump 505's piston 525 produces a negative (vacuum) pressure in the airway system 513 while permitting the escape of air from the fluid line L12 to the airway system 513 via the partially opened right lung valve 507; and each upward stroke of the right lung pump 505's piston 525 produces a positive pressure in the airway system 513 while permitting the escape of air from the airway system 513 to the fluid line L12 via the partially opened right lung valve 507. The escape of air through the partially opened left and right lung valves 503 and 507 simulates a patient gasping for breath, which activates the ventilator. Optionally, before, during, or after the ventilator has been activated to assist (i.e., ventilate) the simulated respiratory system 213, the respective pistons 525 of the left and right lung pumps 501 and 505 can be locked into position so that air flowing from the ventilator to the simulated left and right lungs 515 and 519 simulates the rise and fall of a patient's chest cavity.

In some embodiments, before, during, or after the ventilator has been activated to assist (i.e., ventilate) the simulated respiratory system 213, the left and right lung valves 503 and 507 can each be used to adjust airway resistance—such adjustments are readily detectable by the ventilator. For example, the left and right lung valves 503 and 507 may be adjustable between a closed configuration, one or more partially-opened configurations, and a fully-opened configuration in order to precisely control airway resistance. In some embodiments, one, or both, of the left and right lung valves 503 and 507 are needle valves. In some embodiments, before, during, or after the ventilator has been activated to assist (i.e., ventilate) the simulated respiratory system 213, the compliance control valve 509 can be actuated to the second configuration, in which the port P10 communicates with the port P12, but not the port P11, to change the lung compliance of the simulated left and right lungs 515 and 519 by adjusting the volume of air within the left and right lung compliance reservoirs 517 and 521—such volume adjustments change the effective volume of the simulated left and right lungs 515 and 519. This ability to change the lung compliance of the simulated left and right lungs 515 and 519 realistically simulates the anatomical and physiological phenomena associated with the clinical presentation of lung compliance and its related complications.

When ventilation is initiated, applied PEEP is usually one of the first ventilator settings chosen—it is set directly on the ventilator. A small amount of applied PEEP (4 to 5 cmH2O) is used in most mechanically ventilated patients to mitigate end-expiratory alveolar collapse. A higher level of applied PEEP (>5 cmH2O) is sometimes used to improve hypoxemia or reduce ventilator-associated lung injury in patients with acute lung injury, acute respiratory distress syndrome, or other types of hypoxemic respiratory failure. The amount of air pressure required to generate a given airflow to the simulated left and right lungs 515 and 519 is a function of airway resistance (which can be adjusted using the left and right lung valves 503 and 507), available volume and/or elasticity of the simulated left and right lungs 515 and 519 (which can be adjusted by inflating or deflating the left and right lung compliance reservoirs 517 and 521), and/or the location of additional surrounding elements (e.g., the chest wall, etc.).

When PEEP is applied by the ventilator, the simulated left and right lungs 515 and 519 are pre-inflated by the ventilator at the start of each inspiration—this pre-inflation of the simulated left and right lungs 515 and 519 reduces the remaining available volume within the simulated left and right lungs 515 and 519, which increases the amount of air pressure required for the ventilator to inspire a set volume of air into the simulated left and right lungs 515 and 519. As a result, absent correction, the ventilator could display an inaccurately high pressure measurement. In this regard, the PEEP control system 511 is operable to ensure that the patient simulator 201 (which may be implemented within the environment and/or the manikin 101) responds to the PEEP applied by the ventilator as a human patient, as described in further detail herein.

Referring back again to FIG. 2, in some embodiments, the PEEP control system 511 includes one, or a combination, of the following: an airway pressure sensor 531 and/or a PEEP control valve 533, each configured for electronic communication with the microprocessor 203. For example, turning again to FIG. 8, with continuing reference to FIG. 2, in at least one embodiment, the PEEP control system 511 includes the combination of: the airway pressure sensor 531 and the PEEP control valve 533. The airway pressure sensor 531 is operably coupled to the simulated airway system 513 and configured to continuously detect the air pressure therewithin. The airway pressure sensor 531's continuous detection of the air pressure within the simulated airway system 513 enables the microprocessor circuit 203 to determine when PEEP is applied by the ventilator. As shown in FIG. 8, the PEEP control system 511 may also include a PEEP reservoir 535. In some embodiments, the PEEP reservoir 535 is a silicone rubber bag. The PEEP control valve 533 is configurable to communicate fluid from the simulated airway system 513 to the PEEP reservoir 535, or vice versa. For example, the PEEP control valve 533 may be adjustable between a closed configuration, one or more partially-opened configurations, and a fully-opened configuration in order to precisely control airway resistance between the simulated airway system 513 and the PEEP reservoir 535. In some embodiments, the PEEP control valve 533 is a needle valve.

In operation, for example, the ventilator may be set to deliver a given volume of air (e.g., 120 cc) to the simulated left and right lungs 515 and 519. During normal ventilation, delivery of this given volume of air (120 cc in this case) to the simulated left and right lungs 515 and 519 causes the ventilator to display a baseline pressure measurement (e.g., 15 cmH2O). Using the ventilator, PEEP can then be applied to pre-inflate the simulated left and right lungs 515 and 519 to an applied PEEP setting (e.g., 5 cmH2O) before delivering the set volume of air (120 cc in this case) to the simulated left and right lungs 515 and 519. To accurately simulate a human patient's response to the applied PEEP, the ventilator should display a PEEP pressure measurement approximately equal to the sum of the baseline pressure measurement (15 cmH2O in this case) and the applied PEEP setting (5 cmH2O in this case). However, the applied PEEP causes a reduction in the remaining available volume within the simulated left and right lungs 515 and 519. As a result, delivery of the set volume of air (120 cc in this case) to the simulated left and right lungs 515 and 519 could cause the ventilator to display a PEEP pressure measurement (e.g., 25 cmH2O) that is greater than the sum of the baseline pressure measurement (15 cmH2O in this case) and the applied PEEP setting (5 cmH2O in this case). To correct this difference, when the microprocessor circuit 203 determines that PEEP has been applied (i.e., based on the airway pressure sensor 531's continuous detection of the air pressure within the simulated airway system 513), the PEEP control valve 533 is at least partially opened to permit a portion of the set volume of air (120 cc in this case) to be communicated into the PEEP reservoir 535. This reduces the ventilator's PEEP pressure measurement to an amount that is approximately equal to the sum of the baseline pressure measurement (15 cmH2O in this case) and the applied PEEP setting (5 cmH2O in this case).

In addition to, or instead of, the PEEP control valve 533 and the PEEP reservoir 535, the PEEP control system 511 may include one or more other PEEP control valve(s) and/or one or more other PEEP reservoir(s) configured to communicate with the simulated airway system 513. The one or more other PEEP reservoir(s) may have different volumes from each other and/or the PEEP reservoir 535 in order to accommodate difference levels of applied PEEP.

Figure 9:
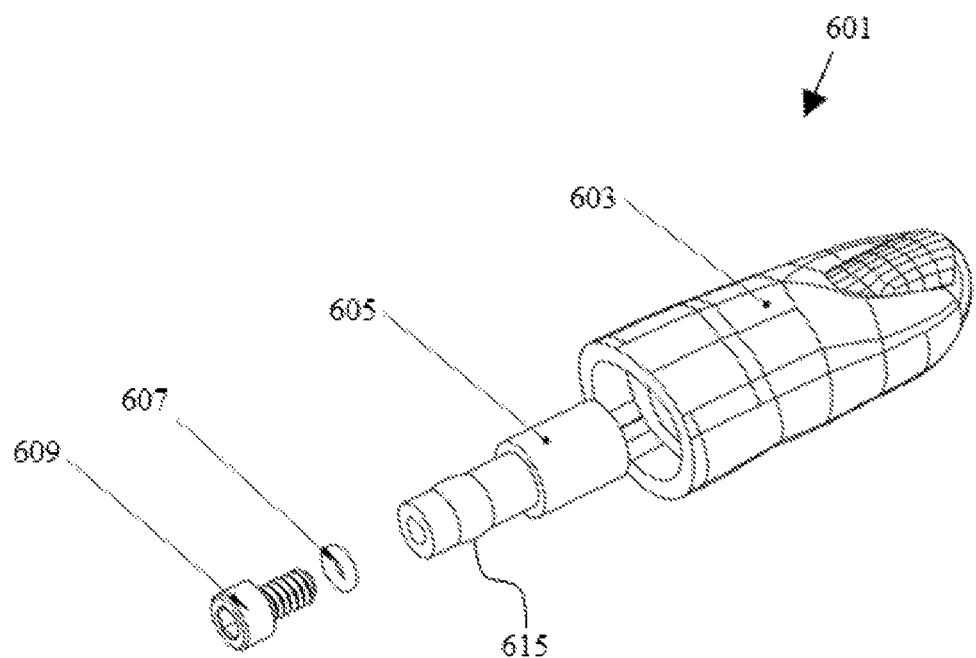
FIG. 9 is an exploded perspective view of a capillary device, which may be implemented at least in part within the environment and/or the manikin of FIG. 1, according to various embodiments of the present disclosure.
Figure 10:
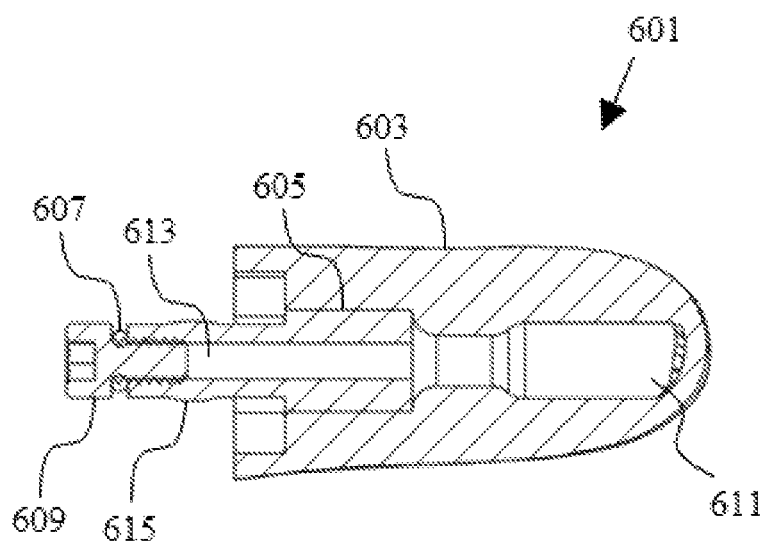
FIG. 10 is a cross sectional view of the capillary device of FIG. 9, according to various embodiments of the present disclosure.

Referring back again to FIG. 1, in some embodiments, the manikin 101 includes a capillary device 601 connected to the simulated hand 111a and/or 111b. Turning to FIGS. 9 and 10, with continuing reference to FIG. 1, in some embodiments, the capillary device 601 includes a simulated fingertip 603, a fitting 605, a sealing ring 607, and a cap 609. The simulated fingertip 603 defines an internal chamber 611 configured to receive simulated blood. The internal chamber 611 may be formed so that the wall thickness of the simulated fingertip 603 varies. In this regard, the thinnest portion of the simulated fingertip 603's wall is located at the position where a glucose lancet is supposed to be placed to draw simulated blood. In some embodiments, the simulated fingertip 603 is made of silicone rubber. The fitting 605 includes an internal passage 613, and is sized and shaped to fit into an end portion of the simulated fingertip 603 so that the internal passage 613 is in fluid communication with the internal chamber 611 of the simulated fingertip 603. In some embodiments, the fitting 605 is affixed to the simulated fingertip 603 with an adhesive (e.g., glue). An end portion 615 of the fitting 605 opposite the simulated fingertip 603 is configured to engage, or be connected, with the remainder of the simulated hand 111a and/or 111b. In some embodiments, the fitting 605 is a machined plastic tube. The sealing ring 607 and the cap 609 are engageable with the fitting 605 at the end portion 615 to seal simulated blood within the internal passage 613 of the fitting 605 and the internal chamber 611 of the simulated fingertip 603. In some embodiments, the cap 609 is threaded.

The capillary device 601 is operable to realistically simulate a finger stick procedure, which is commonly performed in clinical settings to obtain a small quantity of capillary blood for testing. The user fills the capillary device 601 by removing the cap 609 and introducing simulated blood into the internal passage 613 of the fitting 605. Once the internal chamber 611 of the simulated fingertip 603 is filled with simulated blood, the cap 609 can be restored and the capillary device 601 can be used to simulate the finger stick procedure. More particularly, to simulate the finger stick procedure, the user sticks the simulated fingertip 603 with a lancet and squeezes simulated blood out through the puncture. In some embodiments, the simulated fingertip 603 is filled with simulated blood mixed with a desired amount of sugar to facilitate a finger stick procedure for the testing and diagnosis of diabetes. In some embodiments, the capillary device 601 is disposable. In some embodiments, a small amount of absorbent material (e.g., cotton or the like) may be added into the internal chamber 611 of the simulated fingertip 603 to increase the consistency and volume of the simulated blood and to permit the simulated blood to be squeezed out of the absorbent material through the needle picking site while preventing, or at least reducing, the simulated fingertip 603 from being "squashed" when the simulated blood is squeezed out.

In various embodiments, the patient simulator 201 (which may be implemented at least in part within the environment and/or the manikin 101) includes one or more features as provided in medical simulators provided by Gaumard Scientific Company, Inc. based out of Miami, Fla., including but not limited to the following models: S1000 Hal®, S1020 Hal®, S1030 Hal®, S3000 Hal®, S2000 Susie®, S221 Clinical Chloe®, S222 Clinical Chloe®, S222.100 Super Chloe®, S303 Code Blue®, S304 Code Blue®, S100 Susie®, S100 Simon®, S200 Susie®, S200 Simon®, S201 Susie®, S201 Simon®, S203 Susie®, S204 Simon®, S205 Simple Simon®, S206 Simple Susie®, S3004 Pediatric Hal®, S3005 Pediatric Hal®, S3009 Premie Hal®, S3010 Newborn Hal®, S110 Mike®, S110 Michelle®, S150 Mike®, S150 Michelle®, S107 Multipurpose Patient Care and CPR Infant Simulator, S117 Multipurpose Patient Care and CPR Pediatric Simulator, S157 Multipurpose Patient Care and CPR Pediatric Simulator, S575 Noelle®, S565 Noelle®, S560 Noelle®, S555 Noelle®, S550 Noelle®, S550.100 Noelle®, S2200 Victoria®, S2220 Super Tory®, and/or other patient simulators.

The present disclosure introduces a patient simulator, including a simulated thoracic site configured for insertion of a chest tube thereinto, or therethrough, to facilitate a simulated thoracostomy procedure; and a chest fluid reservoir configured to communicate simulated pleural fluid to the chest tube after insertion of the chest tube into, or through, the simulated thoracic site. In various embodiments, the patient simulator further includes a chest fluid valve including a first port in fluid communication, via a first flow path, with the simulated thoracic site, and a second port in fluid communication, via a second flow path, with the chest fluid reservoir; wherein the chest fluid valve is actuable between a first configuration, in which the first port is in fluid communication with the second port, and a second configuration, in which the first port is not in fluid communication with the second port. In various embodiments, the patient simulator further includes a chest tube sensor configured to detect insertion of the chest tube into, or through, the simulated thoracic site. In various embodiments, the patient simulator further includes a microprocessor configured to actuate the chest fluid valve to the first configuration based on the detecting of the insertion of the chest tube into, or through, the simulated thoracic site by the chest tube sensor. In various embodiments, the chest fluid valve further includes a third port with which the second port is in fluid communication when the chest fluid valve is in the second configuration; and the third port is in fluid communication, via a third flow path, with a filling port so that the chest fluid reservoir is replenishable via at least the filling port and the second and third flow paths when the chest fluid valve is in the second configuration. In various embodiments, the chest fluid reservoir includes an expandable vessel in fluid communication, via the second flow path, with the second port of the chest fluid valve, the expandable vessel being actuable between a fully-collapsed state and a fully-expanded state; and a biasing member configured to bias the expandable vessel towards the fully-collapsed state to facilitate the communication of the simulated pleural fluid to the simulated thoracic site. In various embodiments, the simulated thoracic site includes a support housing and an insert that is detachably connectable to the support housing. In various embodiments, the insert includes one, or a combination, of the following: a simulated skin layer, a simulated adipose tissue layer, a simulated ribs layer, a simulated endothoracic fascia layer, and/or a pleura cavity layer.

The present disclosure also introduces a patient simulator, including a simulated catheterization site configured for insertion of a catheter thereinto, or therethrough, to facilitate a simulated urinary catheterization procedure; and a first urinary fluid reservoir configured to communicate simulated urinary fluid, via at least a first flow path, to the catheter after the catheter has been inserted into, or through, the simulated catheterization site. In various embodiments, the patient simulator further includes a check valve operably coupled to the simulated catheterization site and configured to receive the catheter after the catheter has be inserted into, or through, the simulated catheterization site; wherein the first urinary fluid reservoir is permitted to release an initial surge of simulated urinary fluid into the catheter once the catheter has been received by the check valve. In various embodiments, the first urinary fluid reservoir includes an expandable vessel configured to be in fluid communication, via at least the first flow path, with the catheter once the catheter has been received by the check valve, the expandable vessel being actuable between a fully-collapsed state and a fully-expanded state; and a biasing member configured to bias the expandable vessel towards the fully-collapsed state to facilitate the communication of the simulated urinary fluid to the catheter. In various embodiments, the patient simulator further includes a second urinary fluid reservoir configured to communicate simulated urinary fluid, via at least a second flow path, to the catheter after the catheter has been inserted into, or through, the simulated catheterization site. In various embodiments, the patient simulator further includes a urinary valve including a first port in fluid communication, via at least a third flow path, with the simulated catheterization site, and a second port in fluid communication, via the second flow path, with the second urinary fluid reservoir; wherein the urinary valve is actuable between a first configuration, in which the first port is in fluid communication with the second port, and a second configuration, in which the first port is not in fluid communication with the second port. In various embodiments, when the urinary valve is in the first configuration and the catheter has been received by the check valve, the second urinary fluid reservoir is permitted to release additional simulated urinary fluid into the catheter. In various embodiments, the second urinary fluid reservoir includes an expandable vessel configured to be in fluid communication, via at least the second and third flow paths, with the catheter once the catheter has been received by the check valve and the urinary valve has been actuated to the first configuration, the expandable vessel being actuable between a fully-collapsed state and a fully-expanded state; and a biasing member configured to bias the expandable vessel towards the fully-collapsed state to facilitate the communication of the additional simulated urinary fluid to the catheter. In various embodiments, the patient simulator further includes a microprocessor configured to actuate the urinary valve to the first configuration after the initial surge of simulated urinary fluid has been released from the first urinary fluid reservoir into the catheter. In various embodiments, the simulated catheterization site includes either a simulated male urethral opening or a simulated female urethral opening.

The present disclosure also introduces a patient simulator, including a lung pump including a cylinder and a piston dividing the cylinder into first and second chambers, the piston being adapted to reciprocate within the cylinder; a simulated lung in fluid communication, via a first flow path, with the first chamber of the lung pump; and an airway system to which a mechanical ventilator is operably couplable, the airway system being in fluid communication, via a second flow path, with the second chamber of the lung pump. In various embodiments, the patient simulator further includes a compliance control valve having first, second, and third ports, and being actuable between a first configuration, in which the first port is in fluid communication with the second port, but not the third port, and a second configuration, in which the first port is in fluid communication with the third port, but not the second port; wherein the first port is in fluid communication, via at least a portion of the second fluid path, with the first chamber of the lung pump; and wherein the second port is in fluid communication, via at least another portion of the second fluid path, with the simulated lung. In various embodiments, the patient simulator further includes a first lung compliance reservoir positioned adjacent the simulated lung. In various embodiments, the first lung compliance reservoir is in fluid communication with the third port of the compliance control valve so that, when the compliance control valve is in the second configuration, a volume of air within the first lung compliance reservoir can be adjusted to change the lung compliance of the simulated lung.

It is understood that variations may be made in the foregoing without departing from the scope of the present disclosure.

In various embodiments, the elements and teachings of the various embodiments may be combined in whole or in part in some or all of the various embodiments. In addition, one or more of the elements and teachings of the various embodiments may be omitted, at least in part, and/or combined, at least in part, with one or more of the other elements and teachings of the various embodiments.

In various embodiments, while different steps, processes, and procedures are described as appearing as distinct acts, one or more of the steps, one or more of the processes, and/or one or more of the procedures may also be performed in different orders, simultaneously and/or sequentially. In various embodiments, the steps, processes and/or procedures may be merged into one or more steps, processes and/or procedures.

In various embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although various embodiments have been described in detail above, the embodiments described are illustrative only and are not limiting, and those skilled in the art will readily appreciate that many other modifications, changes and/or substitutions are possible in the various embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A patient simulator, comprising:
    a simulated thoracic site configured for insertion of a chest tube thereinto, or therethrough, to facilitate a simulated thoracostomy procedure;
    an expandable vessel configured to communicate simulated pleural fluid to the chest tube in response to insertion of the chest tube into, or through, the simulated thoracic site;
    and
    a chest fluid valve including a first port in fluid communication, via a first flow path, with the simulated thoracic site, and a second port in fluid communication, via a second flow path, with the expandable vessel;
    wherein the expandable vessel is:
        in fluid communication, via the second flow path, with the second port of the chest fluid valve; and
        actuable to:
            an expanded state, in which the expandable vessel is biased towards a collapsed state and defines a first internal volume; and
            the collapsed state, in which the expandable vessel defines a second internal volume that is less than the first internal volume;
    wherein the chest fluid valve is actuable between:
        a first configuration, in which the first port is in fluid communication with the second port, and
        a second configuration, in which the first port is not in fluid communication with the second port;
    and
    wherein, when the expandable vessel is in the expanded state and the chest fluid valve is in the first configuration, the biasing of the expandable vessel towards the collapsed state pushes the simulated pleural fluid from the expandable vessel to the chest tube, via the first and second ports and the first and second flow paths, in response to insertion of the chest tube into, or through, the simulated thoracic site.

2. The patient simulator of claim 1, further comprising a chest tube sensor configured to detect insertion of the chest tube into, or through, the simulated thoracic site.

3. The patient simulator of claim 2, further comprising a microprocessor configured to actuate the chest fluid valve to the first configuration based on the detecting of the insertion of the chest tube into, or through, the simulated thoracic site by the chest tube sensor.

4. The patient simulator of claim 1, wherein the chest fluid valve further includes a third port with which the second port is in fluid communication when the chest fluid valve is in the second configuration; and
    wherein the third port is in fluid communication, via a third flow path, with a filling port so that the expandable vessel is replenishable via at least the filling port and the second and third flow paths when the chest fluid valve is in the second configuration.

5. The patient simulator of claim 1, further comprising:
    a biasing member configured to bias the expandable vessel towards the collapsed state.

6. The patient simulator of claim 1, wherein the simulated thoracic site comprises a support housing and an insert that is detachably connectable to the support housing.

7. The patient simulator of claim 6, wherein the insert comprises one, or a combination, of the following: a simulated skin layer, a simulated adipose tissue layer, a simulated ribs layer, a simulated endothoracic fascia layer, and/or a pleura cavity layer.

8. A method, comprising:
    inserting a chest tube into, or through, a simulated thoracic site of a patient simulator to facilitate a simulated thoracostomy procedure; and
    in response to inserting the chest tube into, or through, the simulated thoracic site, communicating, from an expandable vessel of the patient simulator, simulated pleural fluid to the chest tube;
    wherein the patient simulator further comprises a chest fluid valve including a first port in fluid communication, via a first flow path, with the simulated thoracic site, and a second port in fluid communication, via a second flow path, with the expandable vessel;

wherein the expandable vessel is:
  in fluid communication, via the second flow path, with the second port of the chest fluid valve;
  actuable to:
    an expanded state, in which the expandable vessel is biased toward a collapsed state and defines a first internal volume; and
    the collapsed state, in which the expandable vessel defines a second internal volume that is less than the first internal volume;
and
wherein communicating, from the expandable vessel of the patient simulator, the simulated pleural fluid to the chest tube comprises:
  actuating the expandable vessel to, or maintaining the expandable vessel in, the expanded state, in which the expandable vessel is biased toward the collapsed state; and
  actuating the chest fluid valve:
    from a second configuration, in which the first port is not in fluid communication with the second port;
    to a first configuration, in which the first port is in fluid communication with the second port to permit the biasing of the expandable vessel towards the collapsed state to push the simulated pleural fluid from the expandable vessel to the chest tube, via the first and second ports and the first and second flow paths.

9. The method of claim 8, further comprising:
detecting, using a chest tube sensor of the patient simulator, insertion of the chest tube into, or through, the simulated thoracic site.

10. The method of claim 9, further comprising:
actuating, using a microprocessor of the patient simulator, the chest fluid valve to the first configuration based on the detecting, by the chest tube sensor, of the insertion of the chest tube into, or through, the simulated thoracic site.

11. The method of claim 8, wherein the chest fluid valve further includes a third port with which the second port is in fluid communication when the chest fluid valve is in the second configuration; and
wherein the method further comprises:
  replenishing, via at least a filling port, the second flow path, and a third flow path, the expandable vessel when the chest fluid valve is in the second configuration, the third port being in fluid communication, via the third flow path, with the filling port.

12. The method of claim 8, wherein when the expandable vessel is in the expanded state, a biasing member biases the expandable vessel towards the collapsed state to facilitate the communication of the simulated pleural fluid to the simulated thoracic site.

13. The method of claim 8, wherein inserting the chest tube into, or through, the simulated thoracic site of the patient simulator to facilitate the simulated thoracostomy procedure comprises inserting the chest tube into, or through, an insert that is detachably connected to a support housing of the patient simulator.

14. The method of claim 13, wherein inserting the chest tube into, or through, the insert comprises inserting the chest tube into, or through one, or a combination, of the following: a simulated skin layer, a simulated adipose tissue layer, a simulated ribs layer, a simulated endothoracic fascia layer, and/or a pleura cavity layer.

* * * * *